United States Patent Office 3,427,268
Patented Feb. 11, 1969

3,427,268
NON-PHASING NEOPRENE CEMENT COMPOSITIONS
John A. Fries, Piscataway, N.J., assignor to National Starch and Chemical Corporation, New York, N.Y., a corporation of Delaware
No Drawing. Continuation-in-part of application Ser. No. 511,653, Dec. 6, 1965. This application Nov. 13, 1967, Ser. No. 682,635
U.S. Cl. 260—25     6 Claims
Int. Cl. C08d 9/00; C09j 3/12

ABSTRACT OF THE DISCLOSURE

Non-phasing contact cement compositions based upon polychloroprene containing less than about 2%, by weight, of rosin; said polychloroprene having certain specified crystallinity characteristics and being dissolved in an organic solvent wherein a metallic oxide and a modified phenolic resin are also dispersed.

RELATED APPLICATION

This application is a continuation-in-part of my copending application Ser. No. 511,653, filed Dec. 6, 1965, now abandoned, and assigned to the same assignee as the subject application.

BACKGROUND OF THE INVENTION

This invention relates to a method for the preparation of improved non-phasing, neoprene based contact cement formulations and, more particularly, to the cements thus prepared.

Neoprene, which is the trade name for the polymers of chloroprene, i.e., polychloroprene, has long been used and recognized as a base for adhesive compositions which may be in either a latex, i.e. aqueous emulsion, or an organic solvent lacquer form. The latter lacquers, which are ordinarily referred to as "cements," exhibit excellent adhesive and cohesive strength and may be readily modified in order to exhibit a wide variety of properties. Particularly interesting are the so-called neoprene based "contact" cements which when applied to a solid substrate will, upon drying, yield a film which, without the need for any heat being applied, merely requires the application of pressure in order to affect its bonding to a similarly coated substrate. Thus, a true contact cement is to be clearly distinguished from a cement which, in addition to the application of pressure, also requires the application of heat in order to affect the bonding, to one another, of solid substrates which have been coated therewith.

Unfortunately, the neoprene based contact cements of the prior art have ordinarily exhibited the undesirable characteristic known as phasing. Phasing may be defined as the formation of a flocculent material which settles with time and results in the appearance of two distinct layers or phases. Thus, there is ordinarily a transparent upper layer, having a color characteristic of the resin used in the cement, and a lower, opaque layer having a characteristic milky yellow color. This phasing phenomenon is not indicative of an inferior or denatured product since agitation, before use, readily redisperses the ingredients and restores the cement to its original homogeneous condition. Its occurrence is, however, decidely inconvenient in view of the time consuming agitation which is required for its elimination and also proves troublesome with regard to the poor appearance and resultant lack of consumer appeal on the part of such phased cements, particularly when they are packaged in glass containers.

A number of suggestions have been advanced in order to eliminate the problem of phasing. They have included the use of specific solvent blends, the use of specified alkylated phenolic resins, the use of special grades of magnesium oxide, the elimination of zinc oxide, the use of thixotropic agents and the variation of preparative procedures, etc. Although these suggested methods have, at times, met with some success, they are, for the most part, inapplicable to all conceivable neoprene cement systems. Another procedure for eliminating phasing which has been used with somewhat more success involves the addition, to the cement, of an excess amount of magnesium oxide. This approach, however, effects a significant and undesirable increase in the specific gravity of the cement and also raises its cost.

It is, thus, the prime object of this invention to prepare improved neoprene based contact cement compositions which are characterized by the absence of phasing and by their ability to bond substrates coated therewith in the absence of heating, by the mere application of pressure.

It is a further object to prepare such improved contact cements by means of a procedure and by the use of materials which do not adversely affect the excellent adhesive properties ordinarily present in neoprene cements.

Various other objects and advantages of this invention will become apparent to the practitioner from the following detailed description thereof.

DETAILED DESCRIPTION OF THE INVENTION

I have now found that by the use, as an adhesive base for contact cements, of polychloroprene elastomers which contain no more than about 2%, by weight, of rosin or rosin based derivatives and which possess a low degree of crystallinity as evidenced by their having a melt transition temperature $T_m$ which is less than about 50° C., the resulting adhesive products are found, surprisingly, to be free of the undesirable phenomenon of phasing. In addition, the use of such low rosin content, low crystallinity polychloroprene bases in no way affects the excellent adhesive properties which are ordinarily displayed by neoprene based cements.

The low rosin content neoprene compositions necessary for use as bases for the phase free contact cements of this invention may be products resulting from the solvent extraction of impure chloroprene homopolymers prepared by means of polymerization procedures wherein rosin or rosin derivatives are present as an emulsifier or surfactant for the system, or, they may comprise those chloroprene homopolymers which result from the polymerization of monomeric chloroprene by means of polymerization procedures wherein rosin or a rosin derivative is not utilized as a component of the reaction system.

Thus, neoprene is generally prepared by means of emulsion polymerization techniques wherein the monomeric chloroprene i.e. 2-chloro-butadiene-1,3, is dispersed, as fine droplets, in water containing an emulsifying agent which is ordinarily an alkali rosin soap system such as sodium rosinate. In order to be utilizable in the preparation of our phase-free cements, however, the resulting chloroprene homopolymer must be separated from its emulsion environment. There are various well-known methods for accomplishing this separation; these techniques usually comprising breaking the emulsion and then washing and drying the resulting neoprene resin mass. It has been determined that, as a result of the ineffectiveness of these separation techniques, the resulting solid neoprene may contain at least about four parts per hundred, by weight, of rosin or rosin derivatives.

Therefore, in order to reduce the rosin content of such neoprenes to be below about 2%, by weight, it is necessary to utilize a separation procedure based upon the difference in the relative solubilities of neoprene and rosin in certain classes of solvent. In general, the extraction procedure leading to the preparation of these novel low rosin content neoprene products involves dissolving impure solid neoprene, which has been separated from its latex form, in one or more of the solvents wherein neoprene is soluble. Examples of the latter solvents are aromatic hydrocarbons such as toluene and benzene; chlorinated hydrocarbons such as carbon tetrachloride; and ketones such as methyl ethyl ketone, phenyl methyl ketone and cyclohexanone. To the resulting solution there is then added one or more solvents in which the rosin is soluble to the exclusion of neoprene in amounts such that the neoprene solubility range is exceeded and the neoprene completely precipitates out of solution and, thereupon, separating the thus precipitated solid neoprene from the solvent mixture. Examples of this latter group of solvents include alkanols such as methanol, ethanol and isopropanol; ester alcohols such as diethylene glycol and diethylene glycol monoethyl ether; and, alkanolamines such as diethylethanolamine and triethanolamine.

Needless to say, the need for applying such rosin separation procedures is avoided when chloroprene homopolymers resulting from the use of polymerization procedures wherein rosin or a rosin derivative is at no time present in the polymerization reaction system are employed in preparing my novel cement compositions.

In any event, the solid chloroprene homopolymers, i.e. the polychloroprenes, to be used in my novel cements should contain no more than about 2%, by weight, of rosin or rosin derivatives regardless of its initial mode of polymerization.

The second characteristic which is required to be present in the polychloroprenes applicable for use in preparing my phase free cements relates to the necessity for their possessing a low degree of crystallinity as evidenced by a melt transition temperature $T_m$ which is less than about 50° C. Thus, unless the polychloroprene which is utilized in my process is characterized by this requisite low degree of crystallinity, it will yield adhesive products which have an extremely low solution viscosity which, in turn, causes such products to penetrate porous substrates at an undesirably rapid rate. Moreover, the adhesive films derived from formulations based on such highly crystalline polychloroprenes have a rather short tack life which presents problems in applications wherein a number of substrates are to be coated and maintained for prolonged periods prior to being adhered to one another. And, of great significance, is the fact that the use of highly crystalline polychloroprenes yields adhesives having greatly decreased strength at elevated temperatures which, of course, restricts such products to applications wherein elevated temperatures will not be encountered.

In order to determine the melt transition temperature $T_m$, or crystalline melting point or first order transition point as it is variously referred to, analytical techniques well-known to those skilled in the art may be utilized. Thus, for example, one may employ the classical dilatometry procedure as described in the article by J. T. Maynard and W. E. Mochel on pages 235–250 of volume XIII (1954) of the Journal of Polymer Science. Or, one may on the other hand resort to the use of the presently preferred differential thermal analysis technique as described on pages 157–164 of the "Textbook of Polymer Science" by F. W. Billmeyer, published in 1962 by Interscience Publishers, New York, N.Y.

It should be noted that the polychloroprenes utilizable in this invention can be prepared from low rosin content, low crystallinity unmodified polychloroprenes as well as from similarly treated samples of any of the various commercially available modifications of the homopolymers of chloroprene, such as polychloroprene which has been reacted with sulfur and which also contains a thiuram disulfide stabilizer, polychloroprene in the sol form containing a thiuram disulfide stabilizer but devoid of any sulfur linkages in its polymer molecule as well as polychloroprenes which have been modified so as to exhibit varying viscosities, cure rates, vulcanizate properties, molecular weights, colors and gel or sol physical structures, etc.

In addition to neoprene, the novel adhesive cements of this invention should contain a metallic oxide and, preferably, an antioxidant. The metallic oxides ordinarily used in such neoprene cements are either magnesium oxide or zinc oxide, or mixtures thereof, inasmuch as these two reagents are found to produce the best balance of the desired properties. These metallic oxides serve as acid acceptors by neutralizing the hydrochloric acid which is released upon the aging of neoprene and thereby minimize the deterioration of the substrates which come into contact with the films derived from such cements. They serve, furthermore, as curing agents for the neoprene, thereby increasing the tensile strength of the resulting adhesive bonds, and also aid in the room temperature vulcanization of the neoprene films. The selected metallic oxide or metallic oxide combination should be present in a concentration ranging up to a maximum of about 30%, by weight, of the neoprene in the cement. In a preferred embodiment, magnesium oxide and zinc oxide are present in a combination containing, respectively, 4% of magnesium oxide and 5% of zinc oxide as based on the weight of neoprene.

As previously noted, an antioxidant should, preferably, be present in these neoprene cements in order to prevent deterioration which is ordinarily manifested as discoloration. Among the applicable antioxidants are phenyl-alpha-naphthylamine, phenyl-beta-naphthylamine, phenyl-beta-naphthalene, and 2,2'-methylenebis (4-methyl-6-tertiary butyl-phenol). Concentrations of antioxidant ranging up to a maximum of about 2%, by weight, of the neoprene are sufficient, for purposes of this invention, in order to obtain the desired result.

The solvents applicable for use in preparing these cement formulations may comprise aromatic hydrocarbons such as toluene and xylene, chlorinated aliphatic hydrocarbons such as carbon tetrachloride, chlorinated aromatic hydrocarbons such as o-dichlorobenzene, and ketones such as methyl ethyl ketone and cyclohexanone. Although only one solvent may be used in preparing a cement formulation, in most instances two or more solvents which individually may or may not dissolve neoprene are used in solvent blends to form cements which have been found to be smoother than those obtainable with the use of only one solvent. Typical solvent blends include toluene/hexane (1:2.5), toluene/ethyl acetate (1:4), acetone/kerosene (1:2), ethyl acetate/hexane (1:2), acetone/cylcohexane (1:2), and toluene/hexane/ethyl acetate (1:1.3:1); all of the above concentration ratios being given on a percent, by volume, basis. The use of such solvent blends permits the practitioner to more carefully control and thereby predict the adhesive properties of the resulting cements. Thus, the practitioner should give thought to such factors as rate of evaporation, rack retention, viscosity, and coagulation potential, etc. in selecting the applicable solvents. The concentration of solvent utilized will necessarily depend upon the total solids content desired in the final cement product.

In general, the procedure utilized for preparing the contact cements of this invention involves dissolving the selected low rosin content, low crystallinity neoprene in the desired solvent blend, admixing the antioxidant therewith and then completely dispersing the metallic oxides in the resulting solution. The metallic oxides are usually added to the system in the form of ball milled dispersions prepared with a solvent such as toluene. The various types of mixing containers, e.g. churns, utilizable for the preparation of neoprene based cements are well-known and the choice of a suitable mixing container is left to the practitioner.

The viscosity and total solids content of the resulting cements will vary depending on the eventual application for the specific cements although typical solids contents may range from about 15 to 35%, by weight, while typical viscosities may range from about 100 to 5000 centipoises.

Modified phenolic resins are also usually introduced into the novel phase free cement of this invention in order to impart heat resistance to the films derived therefrom. The techniques for preparing these modified phenolic resins are well-known to those skilled in the art. Thus, alkylated phenolic resins are reacted with magnesium oxide to form the desired modified resins; the latter alkylated phenolic resins consisting of the alkaline catalyzed reaction product of formaldehyde with a monohydric phenol substituted in the para position with radicals selected from the group consisting of alkyl and aryl hydrocarbons, such as p-tertiary butylphenol, p-isopropyl phenol, p-octyl phenol and p-phenyl phenol; with the formaldehyde being present in excess of a 1:1 molar ratio with regard to the phenol. The latter reaction is usually conducted with a concentration of magnesium oxide which does not exceed about 10%, as based on the weight of the resin, and the thus modified resin will be introduced into the cement compositions of this invention in concentrations ranging from about 10 to 100%, by weight, of the neoprene with the optimum concentration ranging from about 40 to 60%, by weight, of the neoprene.

These modified alkyl phenolic resins are generally soluble in the solvents used for the preparation of neoprene solutions and are also compatible with neoprene. Thus, they may be admixed with the previously prepared neoprene cement until a homogeneous system is achieved. If desired, these modified alkyl phenolic resins may be added at any other point of the preparative procedure. The resulting neoprene cements containing these modified resins are found to have a rapid solvent release and high cohesive strength both at room and elevated temperatures.

Various other optional additives may be incorporated into the neoprene based cements of this invention in order to modify the properties thereof. Among these additives may be included: inert fillers such as carbon black, clay and silicates; curing accelerators such as tetramethylthiuram-monosulfide, lead oxide, triethyl trimethylene triamine, s-diphenylthiourea, di-o-toly-guanindine salt of dicatechol borate, and salicylic acid; sulfur; and plasticizers such as butyl oleate and unsaturated vegetable oils, etc.

In all cases, the resulting neoprene based cements will be found to exhibit satisfactory stability and tack retention. With regard to their non-phasing characteristics, the cements prepared, as specified, with neoprene containing no more than about 2%, by weight, of rosin and having the above specified crystallinity characteristics, show no signs of phasing for periods in excess of six months as opposed to comparable cements prepared with neoprene containing higher concentrations of rosin which will phase within about 36 hours to 2 weeks subsequent to their preparation.

In using the neoprene base cements of this invention, they may be applied to substrates by means of a variety of coating techniques. Thus, they may be applied by the use of such mechanical coating implements as a spreader, brush, notched trowel, roller, and sprayer, etc. In practice, the cements are usually applied to both of the surfaces which are to be adhered. The thus coated substrates are allowed to dry so that the solvents are removed therefrom, and are then bonded, in face-to-face position, by the application of nothing more than sufficient pressure to insure intimate contact. The coating weights at which these cements are applied will, of course, vary according to the particular formulation which is utilized and its specific end use application and may range, after drying, from about 0.5 to 20 mils, with typical values ranging from about 1 to 4 mils.

The cement compositions of this invention may be used for the bonding and lamination of a wide variety of substrates including cloth, leather, metal sheets and foils, rubber, paper, paperboard, wood and plastic films and sheets, etc.

It should be noted at this point, that the theoretical basis for the phasing of presently available neoprene cements is thought to be the reaction between the acidic components of the rosin present therein and the metallic ions derived from the necessary presence of a metallic oxide such as magnesium oxide, thereby forming the flocculent metallic soap of rosin acids. The use of a low rosin content homopolymer of chloroprene is the most commercially feasible method for eliminating the floc formation. It should be noted, however, that by esterifying the acids present in the rosin so as to produce an ester resistant to hydrolysis, the formation of the rosin soap may also thereby be prevented. This effect may also be achieved by utilizing anhydrous systems so as to prevent the reaction of the metallic ions with the acidic components of the rosin. At present, however, both of the latter procedures are commercially impractical.

The following examples will further illustrate the embodiment of this phase of the invention. In these examples polychloroprene homopolymers were utilized in all instances and all parts given are by weight unless otherwise noted. The melt transition temperature of all of the neoprene polymer samples utilized in these examples was less than 60° C. unless otherwise noted.

Example A

This example illustrates a typical procedure for the preparation of a low rosin content neoprene applicable for use in preparing the phase free cements of this invention. It further illustrates the rosin content typical of commercial, impure neoprenes.

A vessel equipped with means for mechanical agitation was charged with 300 parts of toluene. To the latter, there was then added 100 parts of pre-masticated neoprene of the type containing thiuram disulfide stabilizer but which had not undergone interpolymerization with sulfur. The resulting mixture was then agitated until the neoprene was completely dissolved. While maintaining agitation, 150 parts of methanol was slowly added to the neoprene solution. The addition of the methanol was continued until the neoprene was completely precipitated. The solvent mixture was then removed, the resulting neoprene mass redissolved in an additional 300 parts of toluene, and the entire extraction procedure repeated. It was determined that the latter extraction procedure had removed 4.5 parts of rosin from the neoprene.

The above described procedure was then repeated, under identical conditions, with the exception that the soft version of the above described modified neoprene and a neoprene containing neither sulfur nor stabilizer were, respectively, substituted for the neoprene extracted in the initially described procedure. By means of these treatments, concentrations of rosins were extracted from the respective neoprene polymers which were comparable to the concentration recovered from the modified neoprene specified in the original extraction.

Example B

This example again illustrates the preparation of low rosin content neoprenes suitable for use in preparing the phase free cements of this invention. It further clearly identifies the material being extracted from the neoprene samples undergoing purification.

The procedure set forth in Example A, wherein the neoprene had undergone two consecutive extractions, was repeated with the exception, in this instance, that an unmodified neoprene was extracted from a 25%, by weight, toluene solution by the addition, thereto, of a methanol:acetone solvent mixture having a weight ratio of 90:10. After the first extraction run, it was determined that 2.35 parts of rosin had been isolated from the neoprene samples.

Utilizing a Beckman IR-9 Infrared Spectrophotometer, a comparison was made between the infrared spectra of the initial, impure neoprene starting material and the purified neoprene obtained after two consecutive extractions by means of the above described procedure. In the impure neoprene, a strong absorption peak was noted at 5.9 microns; the latter being characteristic of the presence of un-ionized carboxyl groups. However, in the purified neoprene resulting from the process of this invention, this peak was missing. It is assumed, therefore, that the carboxyl groups found in the impure neoprene were directly attributable to the residual rosin acids remaining in the neoprene subsequent to its removal from its original emulsion environment.

In order to confirm the above findings, the purified neoprene was admixed with 2%, by weight, of commercial wod rosin. The infrared spectra of this mixture again exhibited the strong absorption peak at 5.9 microns, thus conclusively establishing the presence of rosin in the

Example I

This example illustrates the preparation of an additional neoprene based cement typical of this invention. It further illustrates the unusual non-phasing characteristics of such cements.

The following ingredients were introduced into a mixing vessel and agitated till they formed a homogeneous dispersion.

|  | Parts |
|---|---|
| Neophrene containing less than 1%, by weight, of rosin | 100 |
| 2,2-methylene bis(4-methyl-6-tertiary butyl phenol) (antioxidant) | 2 |
| A ball milled dispersion, in 5 parts of toluene, of 5 parts of magnesium oxide | 10 |
| A 3.7:5.31 solvent blend of acetone:hexane:toluene | 400 |

To the resulting solution there was then added 60 parts of a p-tertiary butyl phenolic resin resulting from the reaction of para-tertiary butyl phenol with an excess of formaldehyde, said resin having been pre-reacted with 10%, by weight, of the resin, of magnesium oxide. The complete mixture was then agitated until a smooth, homogeneous cement was obtained.

On standing in a glass container at room temperature, the resulting cement formulation showed no evidence of phasing for a period in excess of six months. In addition the above described formulation was successfully employed as an adhesive for the bonding of a variety of cellulosic substrates.

Example II

This example illustrates the necessity for utilizing neoprene which contains no more than about 2%, by weight, of rosin in preparing the novel phase free cement formulations of this invention.

The following formulations were prepared by admixing the specified ingredients:

| Formulation | Parts | | | | | | |
|---|---|---|---|---|---|---|---|
|  | #1 | #2 | #3 | #4 | #5 | #6 | #7 |
| Neoprene cement formulation (prepared by means of the procedure described in Example I, hereinabove) | 100 | 100 | 100 | 100 | 100 | 100 |  |
| Commercial wood rosin |  | 2 | 3 | 10 |  |  |  |
| Pentaerythritol rosin ester |  |  |  |  | 3.5 |  |  |
| Wood rosin extracted from impure neoprene |  |  |  |  |  | 3 |  |
| Cement composition prepared from neoprene containing 4.5 parts per hundred of rosin |  |  |  |  |  |  | 100 |

The above described formulations were stored at room temperature in glass containers. They were then periodically examined for the first traces of phasing. Thus, the length of time after which phasing was first noted in each of the various formulations is indicated in the following table.

| Formulation # | Period required for the occurrence of phasing |
|---|---|
| 1 | >6 months. |
| 2 | >6 months. |
| 3 | 4 days. |
| 4 | 36 hours. |
| 5 | 7 days. |
| 6 | 4 days. |
| 7 | 4 days. |

The data summarized above clearly indicates the necessity for utilizing neoprene containing no more than about 2%, by weight, of rosin in order to prepare non-phasing neoprene based cement formulations by means of the process of this invention.

Example III

This example illustrates the excellent adhesive properties of the non-phasing cement formulations of this invention. It further illustrates that these properties are comparable to the corresponding properties of presently available neoprene based cements despite the substitution of a low rosin content neoprene for a conventional neoprene composition.

The cement formulation whose preparation was described in Example I, hereinabove, and a commercially available neoprene based cement (Formulation #7 in Example II, hereinabove) were submitted to the following test procedure in order to determine their respective cohesive strengths.

Two 1″ strips of unsized #10 canvas duck were coated with three successive coats, each having a 4 mil wet thickness of the cement being tested in order to obtain a continuous film of cement over the canvas surface. Each coating was applied after the preceeding coating had completely dried, i.e. after an interval of about 30 minutes. While the final, or uppermost, coating layer was still tacky, the two strips were placed in face-to-face contact with one another. The resulting laminate was then firmly rolled with a steel hand roller in order to insure good contact between the coated films, the application of heat being completely unnecessary in order to affect their bonding. The laminate was next attached to an Instron Tensile Tester by means of a portion at the extremity of each canvas strip which had been left uncoated and the laminate was thereupon pulled apart at a rate of two inches per minute. The force required to separate the canvas laminate was then recorded.

Both the neoprene based cement of this invention and the commercial neoprene based cement showed separation values in the area of 25 pounds per linear inch, thus indicating the retention of excellent adhesive properties in the cements of this invention despite the substitution, therein, of low resin content neoprene.

Example IV

This example illustrates the preparation of an additional neoprene based cement typical of this invention. It further illustrates the unusual non-phasing characteristics of such cements.

The following ingredients were introduced into a mixing vessel and agitated till they formed a homogeneous dispersion.

|  | Parts |
|---|---|
| Neoprene containing less than 1%, by weight, of rosin | 100 |
| 2,2'-methylene bits (4-methyl-6-tertiary butyl phenol) (antioxidant) | 2 |
| A 3.7:5.3:1 solvent blend of acetone:hexane:toluene | 400 |

To the resulting solution there was then added 60 parts of a p-tertiary butyl phenolic resin resulting from the reaction of para-tertiary butyl phenol with an excess of formaldehyde, said resin having been pre-reacted with 10%, by weight, of the resin, of magnesium oxide. The complete mixture was then agitated until a smooth, homogeneous cement was obtained.

On standing in a glass container at room temperature, the resulting cement formulation showed no evidence of phasing for a period in excess of six months. In addition, the above described formulation was successfully employed as an adhesive for the bonding of a variety of cellulosic substrates.

Example V

This example illustrates the criticallity inherent in the use, in preparing the novel phase free contact cements of this invention, of only those low rosin content polychloroprenes having a melt transition temperature within the limits specified herein, i.e. less than about 50° C.

The following formulations were prepared by means of the procedure described in Example I hereinabove.

| Formulation | Parts | |
|---|---|---|
| | #1 | #2 |
| Neoprene containing less than about 1%, by weight, of rosin and having a melt transition temperature of 60° C. | 13.60 | |
| Neoprene containing less than about 1%, by weight, of rosin and having a melt transition temperature in the range of 30-39° C. | | 13.60 |
| A p-tertiary butyl phenolic resin resulting from the reaction of p-tertiary butyl phenol with an excess of formaldehyde, said resin having been pre-reacted with 10%, by weight, of the resin of magnesium oxide | 6.95 | 6.95 |
| A ball milled dispersion, in 5 parts of toluene, of 5 parts of magnesium oxide | 1.36 | 1.36 |
| Toluene | 10.60 | 10.60 |
| Methyl ethyl ketone | 2.50 | 2.50 |
| Hexane | 39.90 | 39.90 |
| Acetone | 26.40 | 26.40 |
| Water | 0.05 | 0.05 |

On determining the solution viscosity of each of these formulations, using a Brookfield viscometer, at 72° F., with a No. 2 spindle operating at 20 revolutions per minute, it was found that Formulation #1 had a viscosity of only 200 centipoise whereas the viscosity of Formulation #2 was substantially higher, being at a level of 400 centipoise.

The tack life, or combining range as it is sometimes referred to, of the adhesive films derived from each formulation was then determined by means of a procedure whereby 1 mil (dry thickness) films of each product were coated upon a large number of 3" x 6" specimens of polyethylene terephthalate film. At a temperature of 75° F., attempts were then periodically made to adhere the coated surfaces of two of the thus prepared film specimens to one another so as to thereby determine the maximum period of time over which the adhesive films from the respective formulations retained their tackiness, i.e. their ability to adhere. In this manner, it was found that the adhesive films derived from Formulation #1 had a tack life of only 15 minutes whereas those films derived from Formulation #2 exhibited the far superior tack life of 3 hours.

Next, the two formulations were compared with respect to their adhesive strength at elevated temperatures by means of a lap shear test conducted as described in ASTM standard D-1002 as published by the American Society for Testing Materials. This test involved the application of a 1 mil (dry thickness) coating of each formulation to a surface of a pair of 1" x 3" aluminum plates; each pair of the thus coated plates then being adhered to its mate so that there was a 1" x ½" overlap of their respective surfaces. After being allowed to cure for 3 days at 72° F., the resulting laminates were subjected to shearing forces in an Instron Tensile Tester in order to determine the force required to affect their delamination; the latter tests being conducted at temperatures of 75 and at 180° F. The higher strength at elevated temperatures exhibited by the adhesive films derived from Formulation #2 was evidenced by the following data:

| Formulation | Lap Shear Strength in Pounds per Square Inch | |
|---|---|---|
| | #1 | #2 |
| Test Temperature, ° F.: | | |
| 75 | 825 | 910 |
| 180 | 160 | 360 |

The results of each of the above described series of tests clearly indicate the importance of utilizing only those low rosin content polychloroprenes whose melt transition temperatures are below about 50° C. in preparing the novel phase free contact cements of this invention.

Summarizing, it is thus seen that this invention provides for the preparation and use of novel phase free, neoprene contact cement compositions based on the low rosin content, low crystallinity polychloroprenes.

Variations may, of course, be made in proportions, procedures and materials without departing from the scope of this invention as defined by the following claims.

What is claimed is:

1. A non-phasing, contact adhesive cement composition comprising an organic solvent dispersion of:
    (1) a solid polychloroprene homopolymer having a melt transition temperature of less than about 50° C. and containing less than about 2%, by weight, of rosin;
    (2) at least one metallic oxide; and,
    (3) a magnesium salt of the alkaline catalyzed reaction product of formaldehyde with a monohydric phenol substituted in the para position with a radical selected from the class consisting of alkyl and aryl groups and having a molar ratio of formaldehyde to phenol in excess of 1:1.

2. The non-phasing, contact cement composition of claim 1, wherein said metallic oxide is selected from the group consisting of magnesium oxide and zinc oxide and is present in a concentration of up to about 30%, by weight, of said polychloroprene homopolymer.

3. The non-phasing, contact cement composition of claim 1, wherein said magnesium salt of the alkaline catalyzed reaction product of formaldehyde with a monohydric phenol is present in a concentration of from about 10 to 100%, by weight, of said polychloroprene homopolymer.

4. The non-phasing, contact cement composition of claim 1, wherein an antioxidant is also present in a concentration of up to about 2%, by weight, of said polychloroprene homopolymer.

5. A non-phasing, contact cement composition comprising an organic solvent dispersion of a solid polychloroprene homopolymer containing less than about 2%, by weight, of rosin and having a melt transition temperature of less than about 50° C.; at least one metallic oxide selected from the group consisting of magnesium oxide and zinc oxide in a concentration of up to about 30%, by weight, of said polychloroprene homopolymer; and, a magnesium salt of the alkaline catalyzed reaction product of formaldehyde with a monohydric phenol substituted in the para position with a radical selected from the class consisting of alkyl and aryl groups and having a molar ratio of formaldehyde to phenol in excess of 1:1 and which is present in a concentration of from about 10 to 100%, by weight, of said polychloroprene homopolymer.

6. The non-phasing, contact cement composition of claim 5, wherein an antioxidant is also present in a concentration of up to about 2%, by weight, of said polychloroprene homopolymer.

(References on following page)

References Cited

UNITED STATES PATENTS

| | | | |
|---|---|---|---|
| 1,967,861 | 7/1934 | Collins | 260—6 |
| 2,080,558 | 5/1937 | Carothers | 260—6 |
| 2,741,651 | 4/1956 | Been et al. | 260—43 |
| 2,918,442 | 12/1959 | Gerrard et al. | 260—29.3 |
| 3,004,011 | 10/1961 | Jackson | 260—92.3 |
| 3,098,844 | 7/1963 | Polishuk | 260—92.1 |
| 3,196,139 | 7/1965 | Best | 260—93.7 |
| 3,285,898 | 1/1966 | MacKenzie et al. | 260—92.3 |

FOREIGN PATENTS

| | | |
|---|---|---|
| 387,325 | 1/1933 | Great Britain. |
| 387,340 | 1/1933 | Great Britain. |
| 387,363 | 1/1933 | Great Britain. |
| 413,666 | 7/1934 | Great Britain. |
| 3,810,985 | 7/1963 | Japan. |

OTHER REFERENCES

Murray et al.: "The Neoprenes," 1963, pp. 21, 29 and 96 relied on.

DONALD E. CZAJA, *Primary Examiner.*

W. E. PARKER, *Assistant Examiner.*

U.S. Cl. X.R.

161—208, 210; 260—27, 41.5, 29.3, 845